June 8, 1926.  W. WINKELMAN  1,588,217
ORE REDUCING FURNACE
Filed June 27, 1923
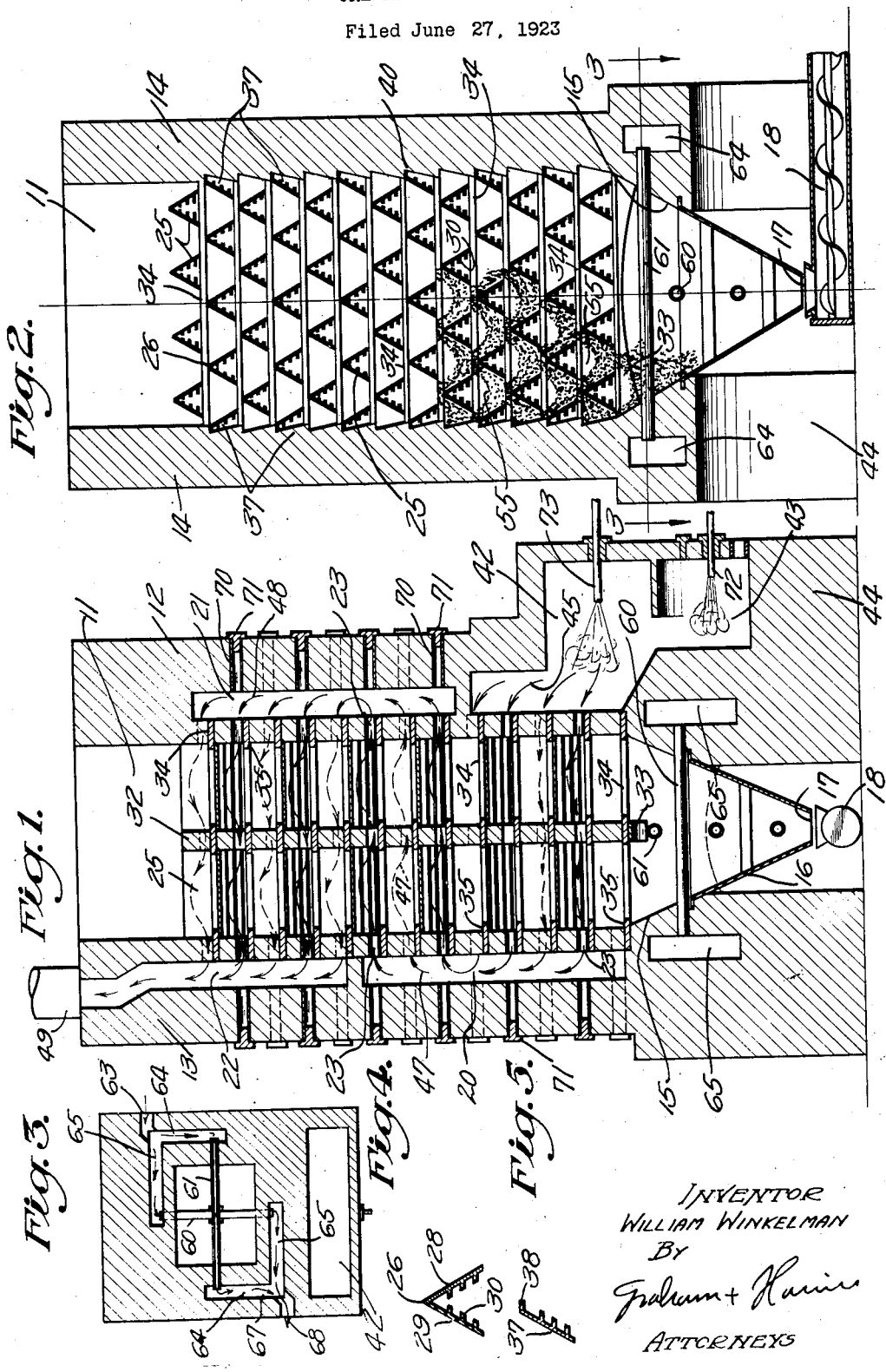

Patented June 8, 1926.

1,588,217

UNITED STATES PATENT OFFICE.

WILLIAM WINKELMAN, OF LOS ANGELES, CALIFORNIA.

ORE-REDUCING FURNACE.

Application filed June 27, 1923. Serial No. 647,998.

This invention relates to metallurgy and relates particularly to a reducing furnace in which oxide and carbonate ores may be subjected to direct reduction.

It is an object of the invention to provide a reduction furnace in which the suitably subdivided ore is brought to reducing temperature, and is at this temperature brought in contact with elements which combine with and eliminate oxygen from the ore, leaving the values of the subdivided ore in a metallic condition.

It is a further object of the invention to provide a process in which the combustion gases from the fire chamber are reduced and are thereafter brought into direct contact with the material to be treated. In many reduction processes, it is customary to combine the ore with a carbonaceous material and to raise the temperature of this mixture to a reducing temperature, thus causing the carbon to take up oxygen from the ore.

My invention operates without the intermixture of carbonaceous materials with the ore, the carbon necessary for reduction being supplied with the heated combustion gases from the combustion chamber, my preferred arrangement causing an extensive contact of the reducing gas with the surfaces presented by the ore, which results in a very rapid and efficient reduction thereof. In the apparatus, heat for producing the required rise in temperature of the ore is derived from combustion in a combustion chamber. Carbon dioxide gas not being suitable for reduction purposes, reducing gases are subsequently formed therefrom.

To produce the reducing gases, gas or oil is burned; and the resultant carbon dioxide is advanced into an auxiliary chamber into which additional fuel is introduced while preventing the entrance of sufficient oxygen thereto to permit complete combustion. The carbon dioxide is thus reduced to carbon monoxide, intermixed with a considerable amount of free carbon. The heated reducing mixture is then directed through lateral passages formed in the body of ore undergoing reduction, and is brought into direct contact with the ore, with the result that the temperature thereof is raised to reducing point and the oxygen of the ore is taken up by the combustion gases, with the result that the reduction of the ore takes place.

The lateral passages through the body of ore are formed by placing across the reduction chamber inverted trough members which are of apex form so that the ore will flow downward freely thereover. The superheated combustion gases are directed underneath the troughs, causing these troughs to become heated by contact so that heat is imparted to the ores from the outer faces of the troughs, as well as by direct contact of the combustion gases therewith.

The especial advantages of the invention and further objects thereof will be made evident hereinafter.

Referring to the drawings which are for illustrative purposes only:

Fig. 1 is a longitudinal vertical section through an ore reducing furnace embodying the features of my invention.

Fig. 2 is a vertical cross section through the furnace.

Fig. 3 is a section on a plane represented by the line 3—3 of Fig. 2.

Fig. 4 is an enlarged sectional view through one of the inverted troughs.

Fig. 5 is a cross section through one of the side plates which cooperate with the troughs in guiding the ore properly down through the reducing chamber and providing passage of the reducing gas laterally through the ore.

As shown in Figs. 1 and 2 of the drawings, a reduction chamber 11 is enclosed between the front and back walls 12 and 13 and side walls 14. The chamber 11 is open at the top and the walls slope inwardly at their lower ends, as indicated at 15, providing boshes from which a tapering metal outlet member 16 downwardly extends, this member 16 having the open lower end 17 thereof disposed above a horizontal conveyor 18 which carries off the reduced ore. In the front and back walls 12 and 13, vertical chambers 20, 21 and 22 are provided, and communicating with the chambers 20, 21 and 22 through openings 23 are inverted channel or trough members 25 which are placed in vertical offset arrangement so that the apices 26 of the trough members 25 in one horizontal row will be intermediately disposed between the trough members of the rows adjacent thereto.

The troughs 25 are made, in the form shown in Fig. 4, from two integrally formed side plates 28 and 29 which meet and form an apex or inverted V 26. The plates 28 and 29 have longitudinal ridges or webs 30 formed upon the inner faces thereof to provide strength and an increase in heat absorbing capacity in the walls. The walls 12 and 13 and the dividing wall 32 which is supported on an arch 33, have plates 34 mounted therein, the edges of which plates project outwardly from the surfaces of the walls and provide shelves 35 upon which the trough members 25 are supported in end engagement, as shown.

Alternate horizontal rows of the trough members are provided with end plates 37 as indicated in Fig. 2. These end plates being constructed as shown in Fig. 5, constitute half troughs which may be employed with the upper edges 38 thereof in engagement with the side walls 14 as indicated at 40.

The ore employed for treatment is generally reduced to small size so that it will flow freely over the trough member disposed across the reducing chamber 11. The ore in flowing downwardly between the trough members 25 and remaining in loose condition forms channels 55 under each inverted trough 25, thus forming through the body of loose ore a multiplicity of laterally extending channels. The superheated gases from the combustion chambers in passing through the passages formed by the inverted troughs 25 and the ore, imparts heat to the plate members 28 and 29 and also imparts heat directly to the ore as a result of direct contact therewith. The heat taken up by the plates 28 and 29 is, of course, transferred to the ore in contact therewith, so that a maximum amount of the heat contained in the combustion gases is imparted to the ore under process of reduction.

A primary combustion chamber 43 and an auxiliary gas-reducing chamber 42 are formed in the forward part of the base 44 which supports the walls 12, 13 and 14. The gas-reducing chamber 42 communicates with the horizontal channels formed by the first five horizontal rows of inverted trough members, constituting the first tier. Hot reducing products formed in the chambers 42 and 43 are directed as indicated by the arrows 45 through the lower channels formed by the troughs 25 and the lower part of the chamber 20, from which they rise and pass toward the chamber 21 through channels formed by the inverted troughs, as indicated by the arrows 47, and from the chamber 21 are again directed as indicated by the arrows 48 into the chamber 22 from which they are thence discharged through a pipe 49.

It is a principal feature of my invention to expose the ore to contact with the superheated gases and to control the characteristic of these gases in such a manner that deoxidation or reduction of the ore will take place while the ore is retained in a loose and subdivided state. For instance, if an oxide is being treated, a reducing heated gas is generated in the combustion chambers and passed through the channels formed across the body of ore, a portion of the superheated reducing gases passing upwardly through the finely divided ore. The carbon or carbon monoxide of the gas combines with and absorbs the oxygen constituents of the oxide, thus reducing the oxide to a metallic state, without sintering the ore.

It will be recognized that the flames and combustion gases as they leave the combustion chamber 42 are at a high temperature, but by the time they reach the chamber 22, the temperature thereof may be considerably reduced. This makes it possible, dispensing with any preheating, to heat the lower portion of the mass of ore contained in the reducing chamber (and partially reduced, without sintering) to the proper reducing temperature, without causing oxidation of the ore at the top of the reducing chamber,— which may be open to the influence of oxygen contained in the air.

The invention also provides a means for promptly cooling the loose ore before its delivery to the conveyor 18, thus preventing re-oxidation after the ore has left the reducing chamber. This is accomplished by means of conduits 60 and 61, which are preferably metal tubes through which a current of cooling medium is passed continuously, this medium, being conveniently cold air which, as shown in Fig. 3, may be directed through an inlet 63 into the arms 64 and 65 of a header from which the conduits 60 and 61 extend to an outlet header 67, from which the air passes as indicated by the arrow 68.

In order to observe the conditions existent in the lateral channels through which the superheated combustion gases continuously pass, sight opening tubes 70 equipped with closure means in the form of plugs 71 are provided. The plugs 71 are tightly fitted in the openings 70 so that no oxygen may be drawn into the reducing gases therethrough.

As is well known, when a carbonaceous material is burned in the presence of sufficient oxygen to provide a complete combustion thereof, carbon dioxide gases are formed in the products of combustion. Carbon dioxide gases are unsatisfactory for use in reducing furnaces. By the use of both the burner 72 and the auxiliary jet 73 in the chamber 43, I am able to produce a carbon monoxide gas containing a certain amount of carbon intermixed with the heated combustion products, which are delivered into the lateral channels through the ore, so that heated carbon and reducing compounds are brought in contact with the exposed faces of the ore, causing the deoxidation thereof.

During the reduction process, the ore, maintaining loose and dry, is preferably continuously withdrawn by the conveyor 18, and, therefore, travels downwardly through the reduction chamber at a slow rate of speed. The weaving in and out of the loose and dry ore streams between the offset inverted trough members 25, causes a mixing action which results in all of the ore being subjected to the action of the heated reducing gases, with the result that a very efficient and economical reduction of the ore is accomplished without the use of intermixed carbonaceous material. Carbonates may also be reduced in the furnace hereinabove described, such carbonates being preferably first converted to oxides, and then deoxidized in the manner hereinabove described.

I claim as my invention:

1. A reducing furnace comprising: side walls provided with projecting shelves having inverted troughs supported thereon to provide transverse passages; means for producing carbon dioxide, means for subsequently reducing the same to a carbon monoxide mixture in advance of its delivery to said transverse passages; and means for conducting said mixture back and forth through said passages in intimate contact with a subdivided ore fed thereto, to reduce the same without sintering.

2. A reducing furnace comprising: walls provided with shelves for supporting non-entering inverted troughs; and inverted troughs adapted to be interposed between said walls and provided with interior reinforcing and heat transferring integral webs extending longitudinally thereof.

3. A reducing furnace comprising: walls supporting inverted troughs above a bosh; and air cooling means comprising ducts disposed at substantially right angles to one another below said troughs.

4. A reducing furnace comprising: walls supporting inverted troughs above a bosh, and cooling means below said troughs, said cooling means comprising air ducts disposed in angular relationship to one another and above a conveyor for removing reduced products.

5. A reducing furnace comprising: walls supporting inverted troughs above a bosh, and cooling means below said troughs, said cooling means comprising air ducts connected with an inlet header and with an outlet header both provided in said bosh.

6. A reducing furnace, comprising: side walls provided with projecting shelves having inverted troughs supported thereon to provide transverse passages; means for producing carbon dioxide, means for subsequently reducing the same to a carbon monoxide mixture; means for conducting said mixture back and forth through said passages in intimate contact with a subdivided ore fed thereto, to reduce the same; and means comprising transverse air ducts opening into headers for cooling said ore within the bosh of said furnace and before exposing the same to the outer air.

7. In a reducing furnace: apertured side walls; substantially horizontal shelves mounted therein and projecting a sufficient lateral distance to serve as supports for inverted troughs; and inverted troughs extending between said walls and terminating, without entering said walls, opposite the respective apertures therein.

In testimony whereof, I have hereunto set my hand at Los Angeles, California, this 22nd day of June, 1923.

WILLIAM WINKELMAN.